(12) United States Patent
Fails et al.

(10) Patent No.: US 7,152,631 B1
(45) Date of Patent: Dec. 26, 2006

(54) PIPE REPAIR TOOL

(76) Inventors: Sidney T. Fails, 5934 N. Williamsburg Rd., Bassfield, MS (US) 39421; Vickie L. Fails, 5934 N. Williamsburg Rd., Bassfield, MS (US) 39421

( * ) Notice: Subject to any disclaimer, the term of this patent is extended or adjusted under 35 U.S.C. 154(b) by 0 days.

(21) Appl. No.: 11/519,840

(22) Filed: Sep. 13, 2006

Related U.S. Application Data

(63) Continuation-in-part of application No. 11/368,607, filed on Mar. 7, 2006, which is a continuation of application No. 10/784,154, filed on Feb. 24, 2004, now Pat. No. 7,007,719.

(51) Int. Cl.
  *F16L 55/18* (2006.01)
(52) U.S. Cl. .......................... 138/97; 138/89
(58) Field of Classification Search ................ 138/89, 138/97; 285/15, 31
  See application file for complete search history.

(56) References Cited

U.S. PATENT DOCUMENTS

| | | | | |
|---|---|---|---|---|
| 1,541,756 A * | 6/1925 | Orr | ............................ | 138/89 |
| 1,616,392 A | 2/1927 | Provost | ...................... | 138/90 |
| 1,993,307 A | 3/1935 | Nicholson | ................... | 138/89 |
| 2,493,452 A * | 1/1950 | Grigg | ........................ | 285/189 |
| 2,735,697 A * | 2/1956 | Zanin | ........................ | 277/328 |
| 2,886,067 A * | 5/1959 | Maxwell et al. | ............. | 138/90 |
| 2,923,323 A | 2/1960 | Franck | ........................ | 138/89 |
| 3,032,069 A | 5/1962 | Ficklin | ........................ | 138/89 |
| 3,298,399 A * | 1/1967 | Slade | ........................ | 138/97 |
| 3,618,809 A | 11/1971 | Martino | ...................... | 220/235 |
| 3,700,265 A | 10/1972 | Dufour et al. | | |
| 4,109,940 A | 8/1978 | Reneau | | |
| 4,529,007 A | 7/1985 | Goforth | ...................... | 138/89 |
| 5,020,572 A | 6/1991 | Hunt | | |
| 5,082,313 A | 1/1992 | Bryant | | |
| 5,247,967 A | 9/1993 | Bourque | | |
| 5,307,841 A | 5/1994 | Condon | ...................... | 138/90 |
| 5,363,881 A | 11/1994 | Larkin | ........................ | 138/89 |
| 5,365,976 A | 11/1994 | Tozer | ........................ | 138/89 |
| 5,473,787 A | 12/1995 | Echols | .................. | 15/104.061 |
| 5,823,581 A | 10/1998 | Coppolo | | |
| 5,884,668 A | 3/1999 | Larkin | ........................ | 138/98 |
| 5,975,587 A | 11/1999 | Wood et al. | | |
| 6,035,898 A * | 3/2000 | Dominguez | .................. | 138/89 |
| 6,508,267 B1 | 1/2003 | Rippolone | | |
| 6,595,559 B1 | 7/2003 | Readman | | |
| 6,641,687 B1 | 11/2003 | Kiest, Jr. et al. | | |
| 6,755,216 B1 | 6/2004 | Mostala | ...................... | 138/98 |
| 6,883,546 B1 | 4/2005 | Kobylinski | .................. | 138/89 |
| 7,007,719 B1 * | 3/2006 | Fails et al. | .................... | 138/97 |

* cited by examiner

*Primary Examiner*—James Hook
(74) *Attorney, Agent, or Firm*—Richard C. Litman

(57) ABSTRACT

The pipe repair tool provides for repairing a damaged section of a pipeline. The repair tool comprises a main body having a top surface and a bottom surface. A compressible alignment portion is positioned above the main body. A compression plate is positioned above the alignment portion. An elongate rod extends through the center of the main body, the alignment portion and the compression plate. A fastener is secured to the top end of the compression rod and a rotatable fastener is secured to the bottom end of the rod. The repair tool is inserted into an open end of a cut pipe so that the top surface of the main body aligns with the open end of the pipe. The alignment portion is then compressed by rotating the rotatable fastener to secure the pipe repair tool inside of the cut pipe.

18 Claims, 8 Drawing Sheets

PIPE REPAIR TOOL

CROSS-REFERENCE TO RELATED APPLICATIONS

This application is a continuation-in-part of application Ser. No. 11/368,607 filed on Mar. 7, 2006, which is a continuation of application Ser. No. 10/784,154, filed Feb. 24, 2004, now issued as U.S. Pat. No. 7,007,719.

BACKGROUND OF THE INVENTION

1. Field of the Invention

The present invention relates to pipe repair tools, and particularly to a pipe repair tool for minimizing the time needed to secure a pipe repair coupling to two sections of an existing pipeline after a damaged section of the pipeline has been removed.

2. Description of the Related Art

When a break occurs in a pipeline, the damaged section of the pipeline is removed by cutting out the damaged section. This leaves two sections of existing piping having cut ends. A repair coupling is typically used to connect the two sections of the pipeline. The cut ends typically need to be beveled to allow the repair coupling to be positioned on the pipes. The beveling of the pipes typically takes a significant amount of time. What is needed is a pipe repair tool that minimizes the time associated with preparing the cut sections of pipe for the repair coupling.

The following patent documents disclose inventions pertaining to pipe repair tools.

U.S. Pat. No. 6,641,687 issued on Nov. 4, 2003 to Kiest, Jr. et al. discloses an apparatus for repairing a pipeline. The apparatus comprises an outer carrier tube with an inner bladder disposed therein and a repair sleeve within the inner bladder. A wick extends from the repair sleeve to the rear end of the bladder tube when the bladder tube is flattened by a vacuum during insertion of a curable resin into the bladder tube.

U.S. Pat. No. 6,595,559 issued on Jul. 22, 2003 to Readman, M. discloses a pipe coupling. The coupling comprises a tubular inner member defining a socket dimensioned to receive a pipe to be connected to the coupling. The inner member is disposed inside of a tubular body to define a closed chamber. An inlet is provided through the body to communicate with the closed chamber.

U.S. Pat. No. 6,508,267 issued on Jan. 21, 2003 to Rippolone, J. D. discloses a plumbing tool and method for repairing a pipe therewith. A plumbing tool includes an elongate hollow shaft and a resilient member attached to the shaft. The plumbing tool is forced into a cut pipe, with the resilient member, having a diameter close fitting with the diameter of the pipe, blocking flow of fluid through the pipe. A valve is then soldered to the pipe, while the fluid is being diverted. The tool is then removed through the valve.

U.S. Pat. No. 5,975,587 issued on Nov. 2, 1999 to Wood et al. discloses a plastic pipe repair fitting and connection apparatus. A repair fitting is provided for sealably connecting ends of a pipeline after a damaged section of the pipeline has been removed. The repair fitting comprises a first and second piston and a first and second cylinder. The first piston slidably engages the first cylinder and the second piston slidably engages the second cylinder.

U.S. Pat. No. 3,700,265 issued on Oct. 24, 1972 to Dufour et al. discloses an internal pipe sealing device having an inner expandable retainer member and an outer elastic sealing member. The pipe sealing member is inserted into a pipe so that the inner retainer member expands to form an air tight seal with the pipe.

U.S. Pat. No. 5,082,313 issued to Bryant et al. on Jan. 21, 1992, U.S. Pat. No. 5,247,967 issued to Bourque, R. B. on Sep. 28, 1993, U.S. Pat. No. 5,823,581 to Coppolo, G. on Oct. 20, 1998, U.S. Pat. No. 5,020,572 issued to Hunt, W. G. on Jun. 4, 1991, and U.S. Pat. No. 4,109,940 issued to Reneau, B. J. on Aug. 29, 1978 each disclose common pipe repair couplings.

None of the above inventions and patents, taken either singly or in combination, is seen to describe the instant invention as claimed. Thus, a pipe repair tool solving the aforementioned problems is desired.

SUMMARY OF THE INVENTION

The present invention provides a pipe tool for repairing a damaged section of a pipeline. The pipe repair tool comprises a generally cylindrical main body having a top surface and a bottom surface. A generally cylindrical, compressible alignment portion is positioned on top of the main body. The alignment portion comprises a bottom surface, which is disposed against the top surface of the main body, and a top surface. A rigid compression plate having a bottom surface, which is disposed against the top surface of the alignment portion, and a top surface, the compression plate being positioned above the alignment portion.

An elongate rod extends through the center of the main body, the alignment portion and the compression plate. The rod comprises a top end that extends though the top surface of the compression plate and a bottom end that extends through the bottom surface of the main body. A fastener is secured to the top end of the compression rod and a rotatable fastener is secured to the bottom end of the rod. The pipe repair tool is inserted into an open end of a cut pipe so that the top surface of the main body aligns with the open end of the cut pipe. The alignment portion is then compressed by rotating the rotatable fastener to secure the pipe repair tool inside of the cut pipe.

In some plumbing installations, it may not be possible to shut off the flow of water completely while repairing the damaged section of pipe. In order to accommodate the flow of water, the pipe repair tool may have at least one conduit or passage extending axially through the tool. For example, the elongated compression rod may be hollow or tubular, defining a conduit through the axial center of the tool. Alternatively, or in addition to the center conduit, the pipe repair tool may have one or more conduits defined therein extending axially parallel to the elongated compression rod.

Accordingly, it is a principal object of the invention to provide a pipe repair for repairing damaged portions of a pipeline.

It is another object of the invention to provide a pipe repair tool that minimizes the amount of time necessary for repairing a damaged portion of a pipeline by eliminating the need for beveling the cut ends of the adjoining sections of piping.

It is a further object of the invention to provide a pipe repair tool that may be used with a common pipe repair coupling.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
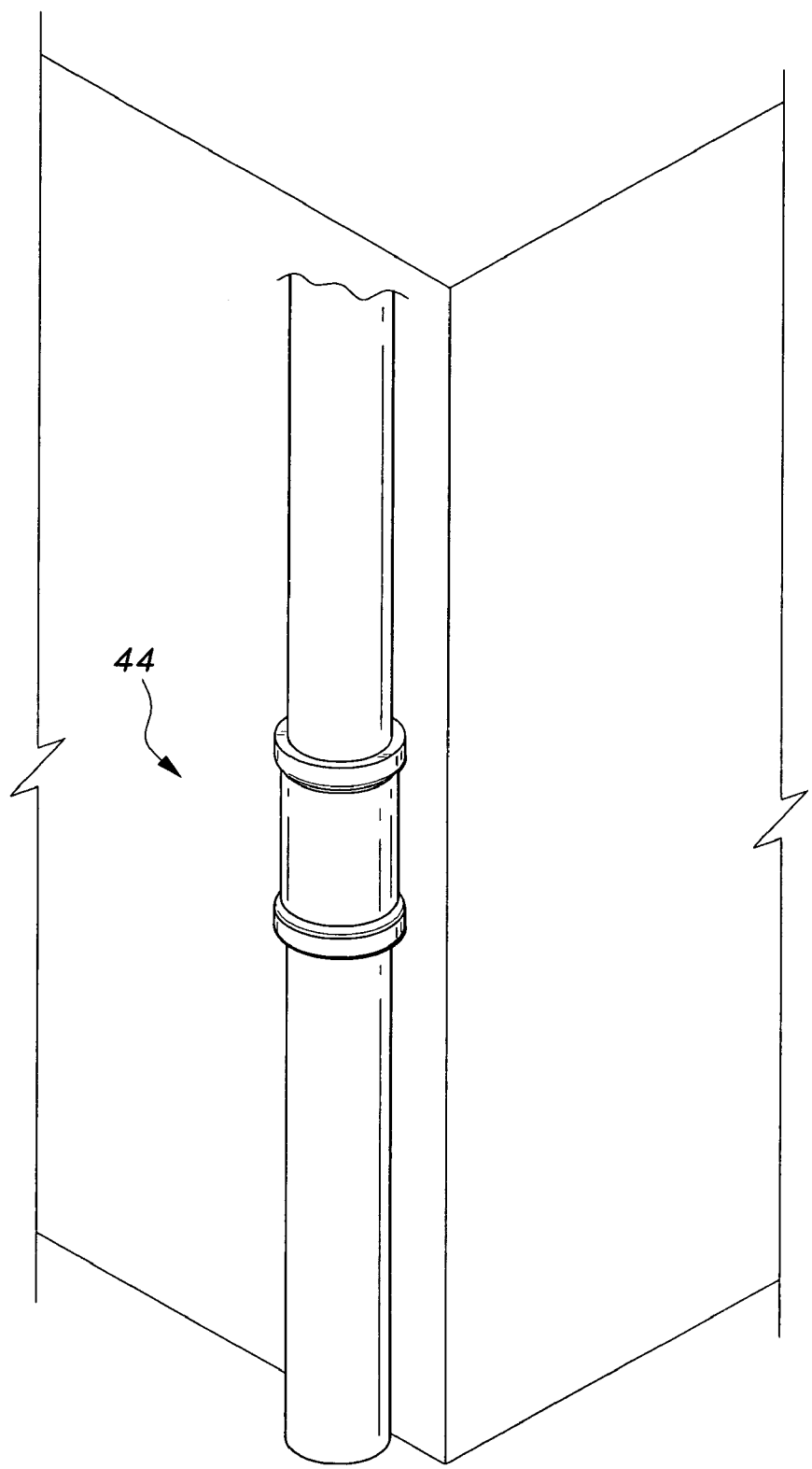
FIG. 1 is an environmental, perspective view of a pipe coupling.

The present invention provides a tool for repairing a damaged pipeline. FIG. 1 depicts two cut portions of a damaged pipeline connected by a pipe coupling 44. When a break occurs in a pipeline, the damaged section is removed by cutting the pipeline. This results in two separate pipe sections having cut ends. The pipe coupling 44 connects and seals the separate pipe sections. The repair tool of the present invention allows the pipe coupling 44 to connect the pipe sections without having to bevel the cut ends of the pipe sections.

Figure 2:
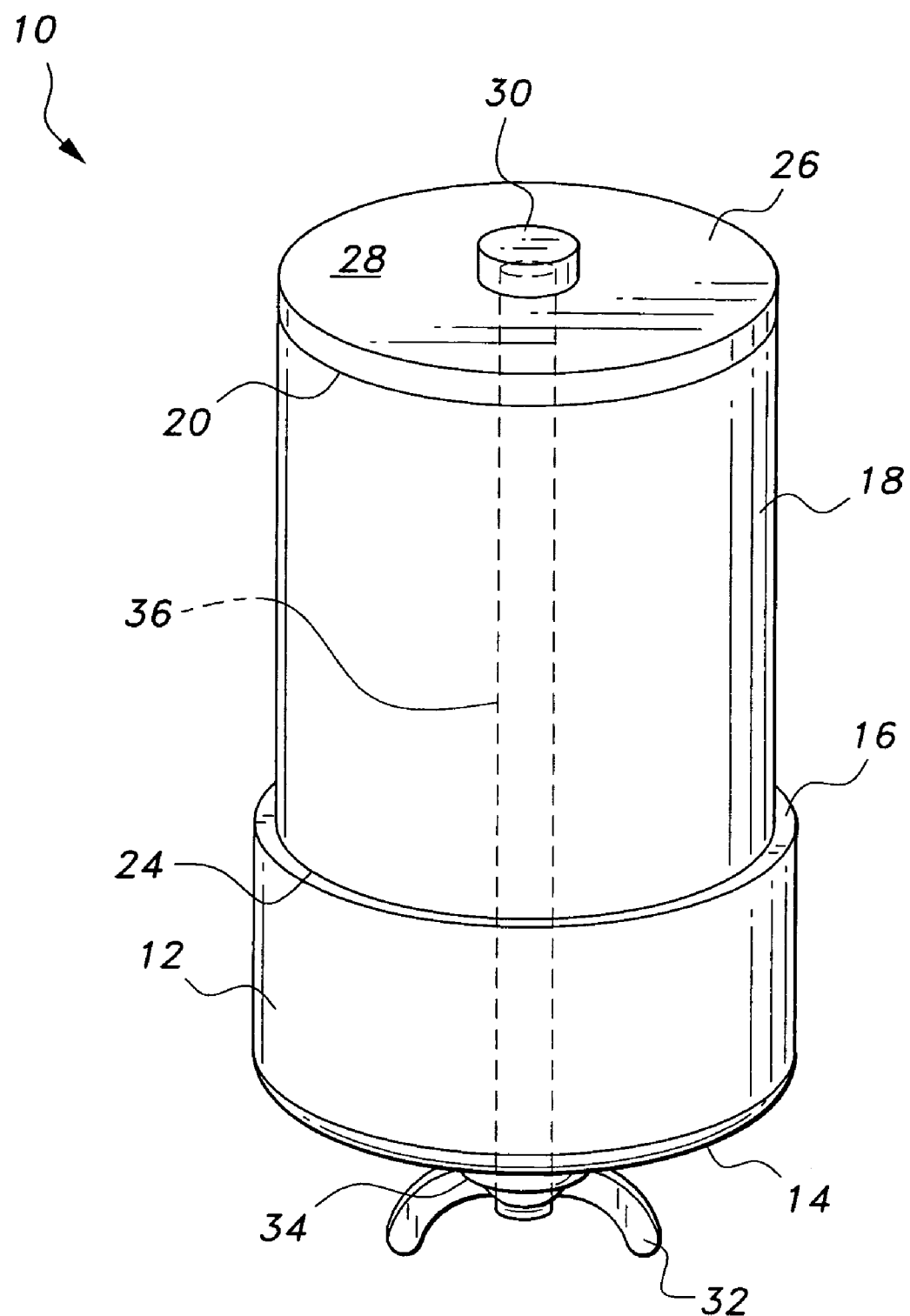
FIG. 2 is a front perspective view of a pipe repair tool, according to the present invention.

FIG. 2 depicts the pipe repair tool 10 of the present invention. The pipe repair tool 10 comprises a main body 12, an alignment portion 18, a compression plate 26, a compression rod 36 and a rotatable fastener 32. The main body 12 is generally cylindrical and comprises the lower portion of the repair tool 10. The main body 12 comprises a top surface 16 and a bottom surface 14. The top surface 16 of the main body 12 is generally flat. The main body 12 is tapered so that the top surface 16 of the main body 12 has a larger circumference than the bottom surface 14 of the main body 12. The main body 12 is preferably made from a plastic material, specifically ultra high molecular weight polyethylene. The main body 12, however, may be made from any high strength, durable material, and the present invention is not limited to only using a plastic material.

The alignment portion 18 is disposed on the top surface 16 of the main body 12. The alignment portion 18 comprises a generally cylindrical, compressible body having a top surface 20 and a bottom surface 24. The alignment portion 18 defines the upper portion of the repair tool 10. The bottom surface 24 of the alignment portion 18 is secured to the top surface 16 of the main body 12. The alignment portion 18 comprises a compressible alignment bushing. The alignment portion 18 is made from a compressible material. The compressible material is preferably, but not limited to, rubber.

The compression plate 26 comprises a generally flat, rigid plate having a top surface 28 and a bottom surface 22. The compression plate 26 is disposed along the top surface 20 of the alignment portion 18. The bottom surface 22 of the compression plate 26 is secured to the top surface 20 of the alignment portion 18.

The compression rod 36 is an elongate rod that extends through the center of the compression plate 26, the alignment portion 18 and the main body 12. The compression rod 36 has a top end that extends through the top surface 28 of the compression plate 26 and a bottom end that extends through the bottom surface 14 of the main body 12. The top end and the bottom end of the compression rod 36 are threaded for engaging fasteners. A fastener 30 is secured to the top end of the compression rod 36 along the top surface 28 of the compression plate 26. A rotatable fastener 32 is secured to the bottom end of the compression rod 36. The rotatable fastener 32 is preferably a wing nut; however, any suitable rotatable fastener may be used. The pipe repair tool 10 further comprises a flat washer 34 disposed around the bottom end of the compression rod 36 between the bottom surface 14 of the main body 12 and the rotatable fastener 32. According to certain preferred embodiments of the present invention, the compression rod 36 and the top fastener 30 may be replaced by a bolt.

Figure 3:
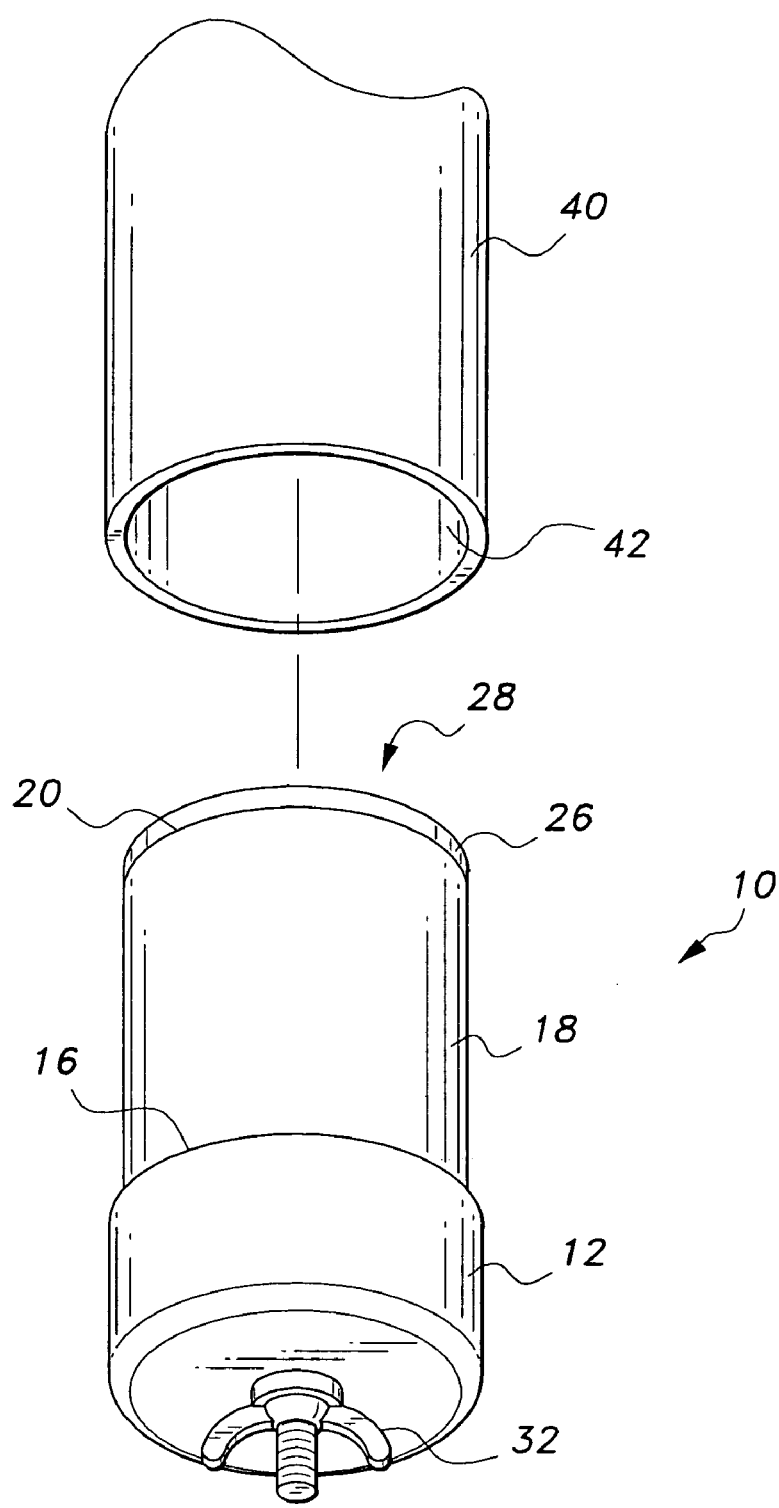
FIG. 3 is a front view of the pipe repair tool being inserted into a cut water pipe.
Figure 4:
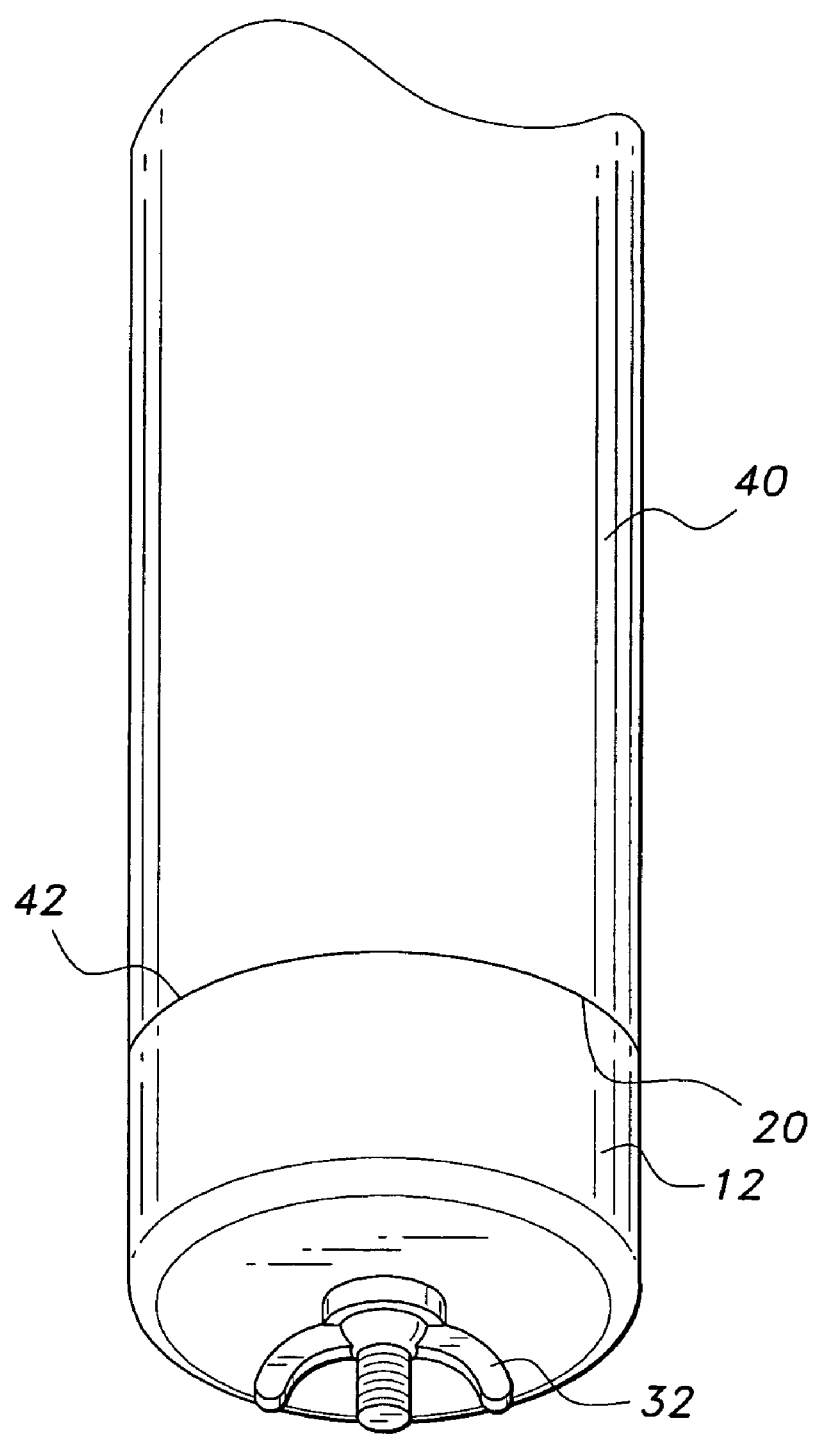
FIG. 4 is a front view of the pipe repair tool inserted into the cut water pipe.
Figure 5:
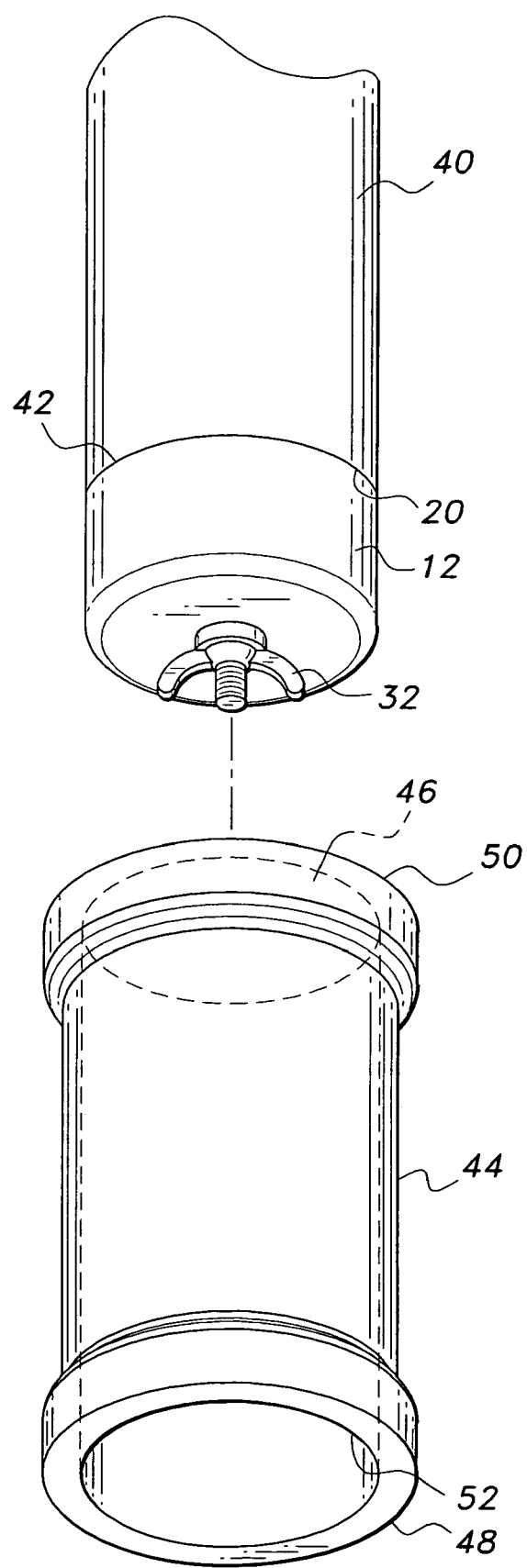
FIG. 5 is a front view of a pipe knock on being inserted over the pipe repair tool.

FIGS. 3–7 depict the method of using the pipe repair tool 10 to fix a damaged pipeline. FIG. 3 depicts a first cut pipe section 40 having an opening 42. The alignment portion 18 of the repair tool 10 is inserted into the opening 42 of the first pipe section 40. The repair tool 10 is inserted into the first pipe section 40 until top surface 16 of the main body 12 contacts the cut surface of the opening 42 of the first pipe section 40. Once the repair tool 10 is fully inserted into the first pipe section 40, the wing nut 32 is rotated. By rotating the wing nut 32 on the fixed compression rod 36, the compression plate 26 is forced downward onto the alignment portion 18. The compression plate 26 compresses the alignment portion 18, causing the circumference of the alignment portion 18 to expand until the repair tool 10 is secured inside of the first pipe section 20 (as shown in FIG. 4). The compression process aligns the top surface 20 of the man body 12 with the surface of the opening 42 of the first pipe section 40.

Figure 6:
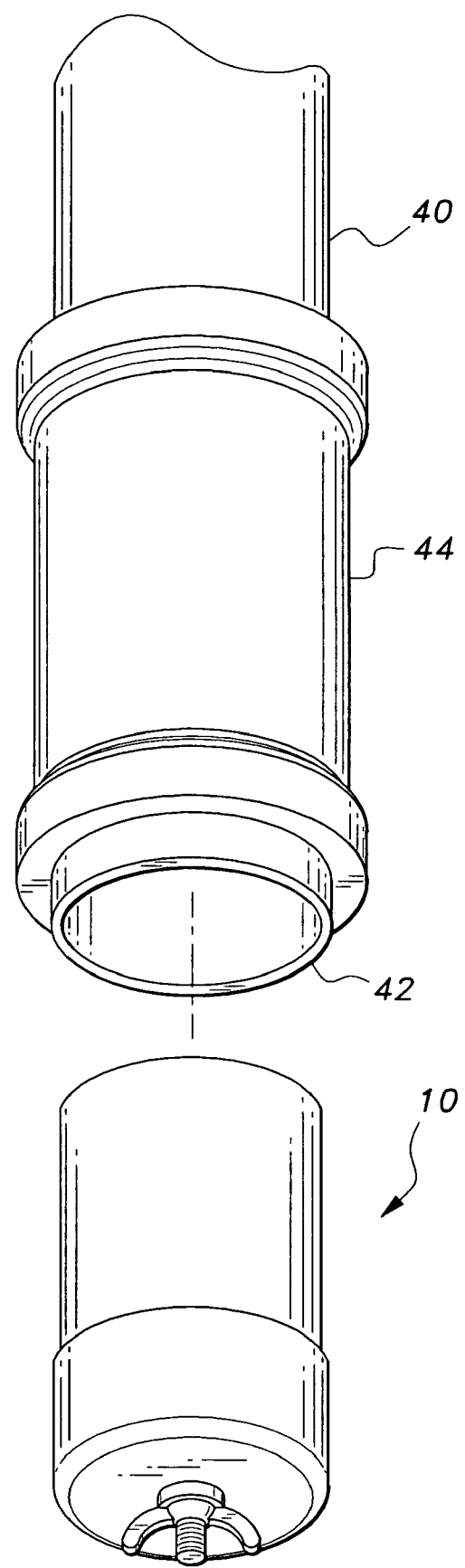
FIG. 6 is a front view of the pipe repair tool being removed from the cut water pipe.
Figure 7:
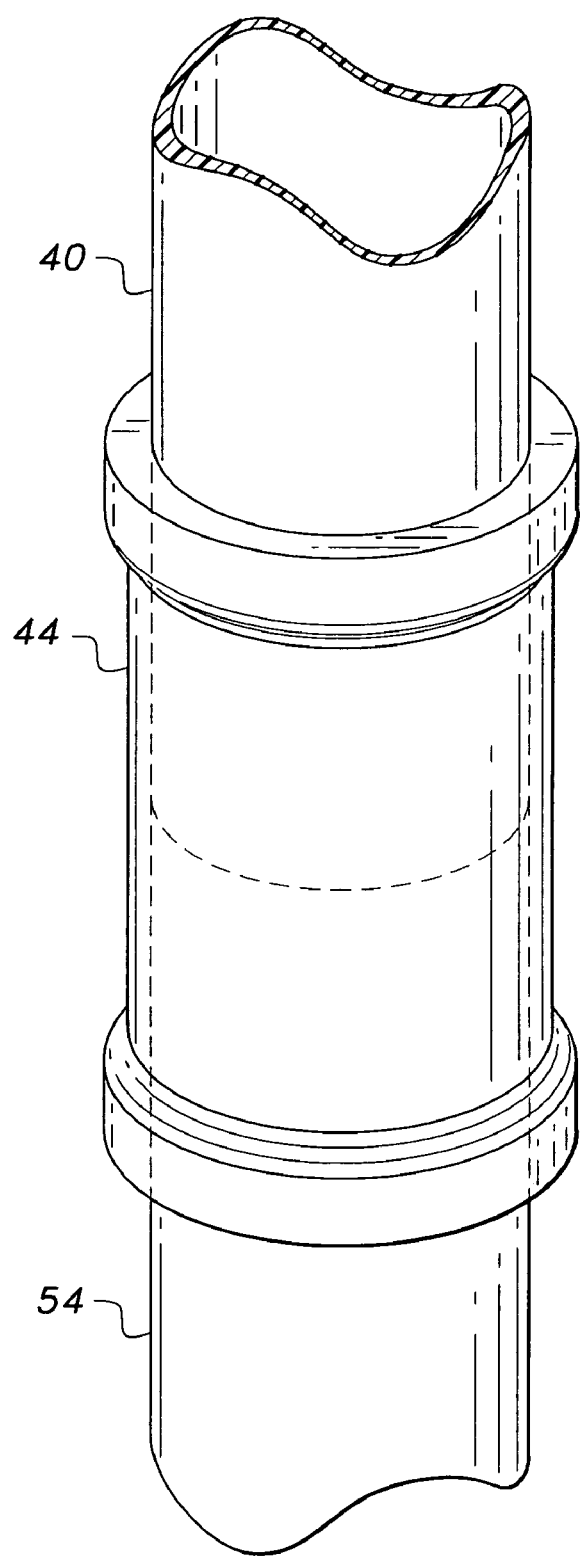
FIG. 7 is a front view of the completed pipe coupling.

Once the pipe repair tool 10 is secured inside of the first pipe section 40, a knock on repair coupling 44 is placed over the first pipe section 40. The repair coupling 44 comprises a generally cylindrical main body having an open top end 46 and an open bottom end 48. The exterior surface of the first pipe 40, the exterior surface of the pipe repair tool 10 main body 12, and the interior surface of the repair coupling 44 are lubricated so that the repair coupling 44 may easily slide onto the first pipe section 40. As shown in FIG. 6 the repair coupling 44 is positioned above the bottom opening 42 of the first pipe section 40. The wing nut 32 is then rotated to release the pipe repair tool 10 from the interior of the first pipe section 40. Once the pipe repair tool 10 is removed from the first pipe section 40 a second pipe section 54 (shown in FIG. 7) is aligned with the first pipe section 40. The repair coupling 44 is then slid downward and positioned over the connection point of the first pipe section 40 and the second pipe section 54. The repair coupling 44 further comprises a top gasket 50 disposed along the top open end 46 of the repair coupling 44 and a bottom gasket 52 disposed along the bottom open end 48 of the repair coupling 44. The repair coupling 44 provides a secure connection of the first pipe section 40 to the second pipe section 54.

In some instances, aged water systems are damaged to such an extent that the valves cannot be turned off to stem water flow, or can only be partially turned off, and repairs must be accomplished while the water is still flowing. In such instances, the embodiment of the repair tool as illustrated in FIG. 8 can be employed.

Figure 8:
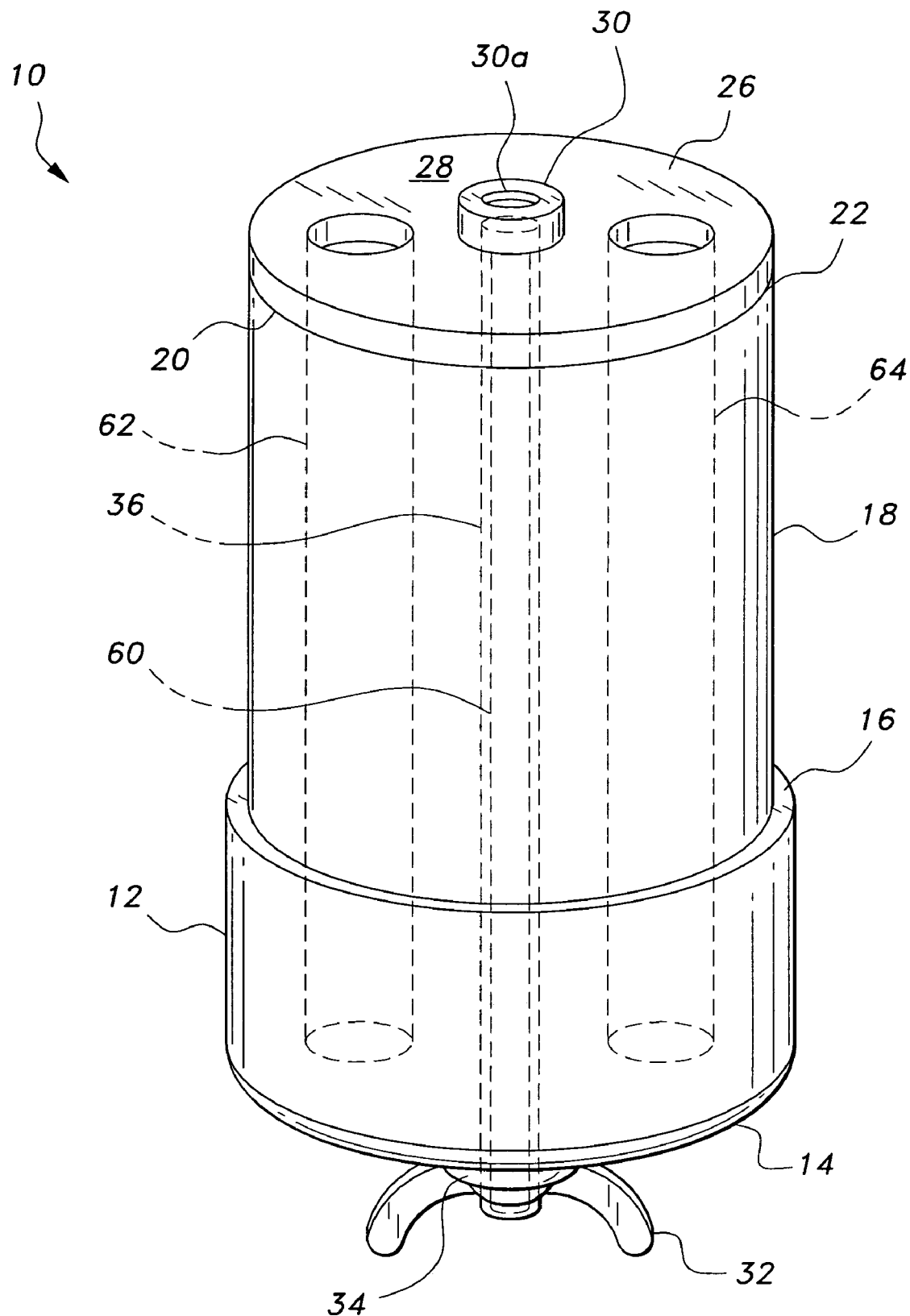
FIG. 8 is a front perspective view of a second embodiment of a pipe repair tool, according to the present invention.

In FIG. 8, the pipe repair tool 10 has at least one conduit for the passage water defined axially through the tool 10. For example, compression rod 36 may be hollow or tubular, and fastener 30 may have a bore 30a defined therein (e.g., fastener 30 may be a conventional hexagonal nut), thereby defining a central conduit 60 extending axially through the center of the tool 10.

Alternatively, or in addition to central conduit 60, the pipe repair tool 10 may have one or more conduits 62 and 64 extending eccentrically and axially through the tool 10 parallel to compression rod 36. Conduits 62, 64 may be defined simply by bores extending through compression plate 26, alignment portion 18 and main body 12. Alternatively, conduits 62, 64 may comprise compressible tubes attached to and extending from the compression plate 28 through bottom surface 14 of main body 12. In still another alternative, alignment portion 18 need not be a completely solid cylindrical body, so long as alignment portion expands laterally when compressed sufficient to wedge tool 10 in pipe 40, but may have hollow channels extending axially therethrough aligned with openings in compression plate 26 and main body 12. In yet another alternative, alignment portion 18 may be formed from foam rubber, similar to a sponge, and compression plate 26 and main body 12 may be porous or have drain openings or perforations defined therein to permit water to drain when rotatable fastener 32 is rotated to compress alignment portion 18.

Eccentric conduits 62, 64, when present, may be formed in any desired manner to permit the flow of water through pipe repair tool 10. It will be understood that while two discrete conduits 62 and 64 are shown in FIG. 8, the pipe repair tool may have any desired number of conduits defined therein, provided that the body of alignment portion 18 is capable of expanding sufficiently to wedge pipe repair tool 10 in the cut pipe 40.

The plural conduits 60, 62 and 64 are disposed through the tool 10 to allow water or other fluid to flow therethrough during the repair phase, thus preventing backpressure build up. Although three generally vertical conduits are shown, it should be recognized that the number of conduits and orientation thereof may be changed to accommodate different flow characteristics.

It is to be understood that the present invention is not limited to the embodiments described above, but encompasses any and all embodiments within the scope of the following claims.

We claim:

1. A pipe repair tool, comprising:
   a generally cylindrical main body having a flat top surface and a flat bottom surface;
   said main body being tapered so that the bottom surface of the main body comprises a smaller circumference than the top surface of the main body, wherein the main body top surface circumference is configured to equal the outer circumference of a pipe being repaired;
   a generally cylindrical, compressible alignment portion having a bottom surface disposed against the top surface of said main body and having a top surface;
   said generally cylindrical, compressible alignment portion having a circumference that is constant throughout the length of the alignment portion, and is less than the circumference of said main body top surface;
   a rigid, flat compression plate having a bottom surface disposed against the top surface of said alignment portion and having a top surface;
   said rigid, flat compression plate being generally cylindrical and having a circumference generally equal to the circumference of said alignment portion top surface;
   an elongate compression rod extending through the center of the main body, the alignment portion and the compression plate;
   said compression rod having a top end that extends outwardly beyond the top surface of the compression plate and a bottom end that extends outwardly beyond the bottom surface of the main body;
   a fastener secured to the top end of said compression rod;
   a rotatable fastener secured to the bottom end of said compression rod;
   a flat washer disposed around the bottom end of said compression rod, said flat washer being located between the bottom surface of said main body and said rotatable fastener; and
   at least one conduit extending axially through the main body, the alignment portion and the compression plate, the conduit providing for passage of fluid through the tool;
   whereby the pipe repair tool is inserted into an open end of a cut pipe so that the top surface of said main body aligns with the open end of the cut pipe, and the alignment portion is compressed by rotating the rotatable fastener to secure the pipe repair tool inside of the cut pipe.

2. The pipe repair tool according to claim 1, wherein said compression rod is tubular, said compression rod defining the at least one conduit.

3. The pipe repair tool according to claim 1, wherein said at least one conduit comprises a conduit extending eccentrically and axially through said compression plate, said alignment portion, and said main body parallel to said compression rod.

4. The pipe repair tool according to claim 1, wherein said at least one conduit comprises a bore defined through said compression plate, said alignment portion, and said main body, the bore extending eccentrically and axially through said compression plate, said alignment portion, and said main body parallel to said compression rod.

5. The pipe repair tool according to claim 1, wherein said at least one conduit comprises a plurality of conduits extending eccentrically and axially through said compression plate, said alignment portion, and said main body parallel to said compression rod.

6. The pipe repair tool according to claim 1, wherein said at least one conduit comprises:
   a passage defined through said compression rod, said compression rod being tubular, defining a first conduit; and
   at least one second conduit extending eccentrically and axially through said compression plate, said alignment portion, and said main body parallel to said compression rod.

7. A pipe repair assembly, comprising:
   a pipe repair tool having:
      a generally cylindrical main body having a flat top surface and a flat bottom surface;
      said main body being tapered so that the bottom surface of the main body comprises a smaller circumference than the top surface of the main body, wherein the main body top surface circumference is configured to equal the outer circumference of a pipe being repaired;
      a generally cylindrical, compressible alignment portion having a bottom surface disposed against the top surface of said main body and having a top surface;
      said generally cylindrical, compressible alignment portion having a circumference that is constant throughout the length of the alignment portion, and is less than the circumference of said main body top surface;
      a rigid, flat compression plate having a bottom surface disposed against the top surface of said alignment portion and having a top surface;
      said rigid, flat compression plate being generally cylindrical and having a circumference generally equal to the circumference of said alignment portion top surface;

an elongate compression rod extending through the center of the main body, the alignment portion and the compression plate;

said compression rod having a top end that extends outwardly beyond the top surface of the compression plate and a bottom end that extends outwardly beyond the bottom surface of the main body;

a fastener secured to the top end of said compression rod;

a rotatable fastener secured to the bottom end of said compression rod;

at least one conduit extending through the main body, the alignment portion and the compression plate, the conduit providing for flow of a fluid through the tool; and at least one generally cylindrical pipe coupling having an open top end and an open bottom end;

whereby the pipe repair tool allows the at least one pipe coupling to connect two cut sections of pipe from a damaged pipeline without having to bevel the cut ends of the pipe sections.

8. The pipe repair assembly according to claim 7, wherein said compression rod is tubular, said compression rod defining the at least one conduit.

9. The pipe repair assembly according to claim 7, wherein said at least one conduit comprises a conduit extending eccentrically and axially through said compression plate, said alignment portion, and said main body parallel to said compression rod.

10. The pipe repair assembly according to claim 7, wherein said at least one conduit comprises a bore defined through said compression plate, said alignment portion, and said main body, the bore extending eccentrically and axially through said compression plate, said alignment portion, and said main body parallel to said compression rod.

11. The pipe assembly according to claim 7, wherein said at least one conduit comprises a plurality of conduits extending eccentrically and axially through said compression plate, said alignment portion, and said main body parallel to said compression rod.

12. The pipe repair assembly according to claim 7, wherein said at least one conduit comprises:

a passage defined through said compression rod, said compression rod being tubular, defining a first conduit; and at least one second conduit extending eccentrically and axially through said compression plate, said alignment portion, and said main body parallel to said compression rod.

13. A pipe repair tool, comprising:

a generally cylindrical main body having a flat top surface and a flat bottom surface, the main body being tapered so that the bottom surface of the main body comprises a smaller circumference than the top surface of the main body, the main body top surface circumference being configured to equal the outer circumference of a pipe being repaired;

an elongated, generally cylindrical, compressible alignment portion having a bottom surface disposed against the top surface of the main body and having a top surface, the alignment portion having a uniform circumference throughout the length of the alignment portion, the alignment portion circumference being less than the circumference of the main body top surface;

a rigid, flat compression plate having a bottom surface disposed against the top surface of the alignment portion and having a top surface, the compression plate being generally cylindrical and having a circumference generally equal to the circumference of the alignment portion top surface;

an elongate compression rod extending axially through the center of the main body, the alignment portion and the compression plate, the compression rod having a top end extending outwardly beyond the top surface of the compression plate and a bottom end extending outwardly beyond the bottom surface of the main body;

a fastener secured to the top end of the compression rod;

a rotatable fastener secured to the bottom end of the compression rod;

a flat washer disposed around the bottom end of the compression rod, the flat washer being located between the bottom surface of the main body and the rotatable fastener; and means for passage of fluid flow through the compression plate, the alignment portion and the main body;

whereby the pipe repair tool is inserted into an open end of a cut pipe so that the top surface of said main body aligns with the open end of the cut pipe, and the alignment portion is compressed by rotating the rotatable fastener to secure the pipe repair tool inside of the cut pipe.

14. The pipe repair tool according to claim 13, wherein said means for passage comprises a conduit defined through said compression rod, said compression rod being tubular.

15. The pipe repair tool according to claim 13, wherein said means for passage comprises a conduit extending eccentrically and axially through said compression plate, said alignment portion, and said main body parallel to said compression rod.

16. The pipe repair tool according to claim 13, wherein said means for passage comprises a bore defined through said compression plate, said alignment portion, and said main body, the bore extending eccentrically and axially through said compression plate, said alignment portion, and said main body parallel to said compression rod.

17. The pipe repair tool according to claim 13, wherein said means for passage comprises a plurality of conduits extending eccentrically and axially through said compression plate, said alignment portion, and said main body parallel to said compression rod.

18. The pipe repair tool according to claim 13, wherein said means for passage comprises:

a first conduit defined through said compression rod, said compression rod being tubular; and at least one second conduit extending eccentrically and axially through said compression plate, said alignment portion, and said main body parallel to said compression rod.

* * * * *